United States Patent
Hitosuga

(10) Patent No.: US 8,024,669 B2
(45) Date of Patent: Sep. 20, 2011

(54) IMAGE PICKUP APPARATUS

(75) Inventor: Emi Hitosuga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 513 days.

(21) Appl. No.: 12/353,700

(22) Filed: Jan. 14, 2009

(65) Prior Publication Data
US 2009/0187861 A1  Jul. 23, 2009

(30) Foreign Application Priority Data
Jan. 22, 2008  (JP) ................... 2008-011995

(51) Int. Cl.
G06F 3/048  (2006.01)
(52) U.S. Cl. ......... 715/835; 715/823; 715/821; 715/810
(58) Field of Classification Search .................. 715/764, 715/765, 781, 810, 821, 823, 835, 846, 864, 715/866; 345/169
See application file for complete search history.

(56) References Cited

U.S. PATENT DOCUMENTS

| | | | |
|---|---|---|---|
| 6,484,189 B1* | 11/2002 | Gerlach et al. | 715/201 |
| 6,950,679 B2* | 9/2005 | Sugiyama et al. | 455/566 |
| 7,685,530 B2* | 3/2010 | Sherrard et al. | 715/764 |
| 2003/0011640 A1* | 1/2003 | Green et al. | 345/810 |
| 2008/0163114 A1* | 7/2008 | Choi et al. | 715/810 |
| 2008/0204402 A1* | 8/2008 | Hirata et al. | 345/156 |
| 2008/0220821 A1* | 9/2008 | Okuzako et al. | 455/566 |

FOREIGN PATENT DOCUMENTS
JP    11-275394 A    10/1999
* cited by examiner

Primary Examiner — Xiomara L Bautista
(74) Attorney, Agent, or Firm — Canon USA Inc IP DIvision

(57) ABSTRACT

An image pickup apparatus allows a user to quickly find a changed setting value in a list screen after the user changes the setting value of a desired setting item and returns to the list screen. When a rightward direction button is pressed with the list screen being displayed on a display unit, a setting screen of a drive mode is displayed. When a desired drive mode is selected in the setting screen by using a rightward or leftward direction button, an icon is displayed in a predetermined color for indicating selection. When the setting is activated by a set button, a highlight is displayed on the icon in order to indicate activation. After the highlight is displayed for a predetermined period of time, the screen is changed to the list screen, and the previously set drive mode is highlighted so that the user quickly recognizes the changed drive mode.

12 Claims, 8 Drawing Sheets

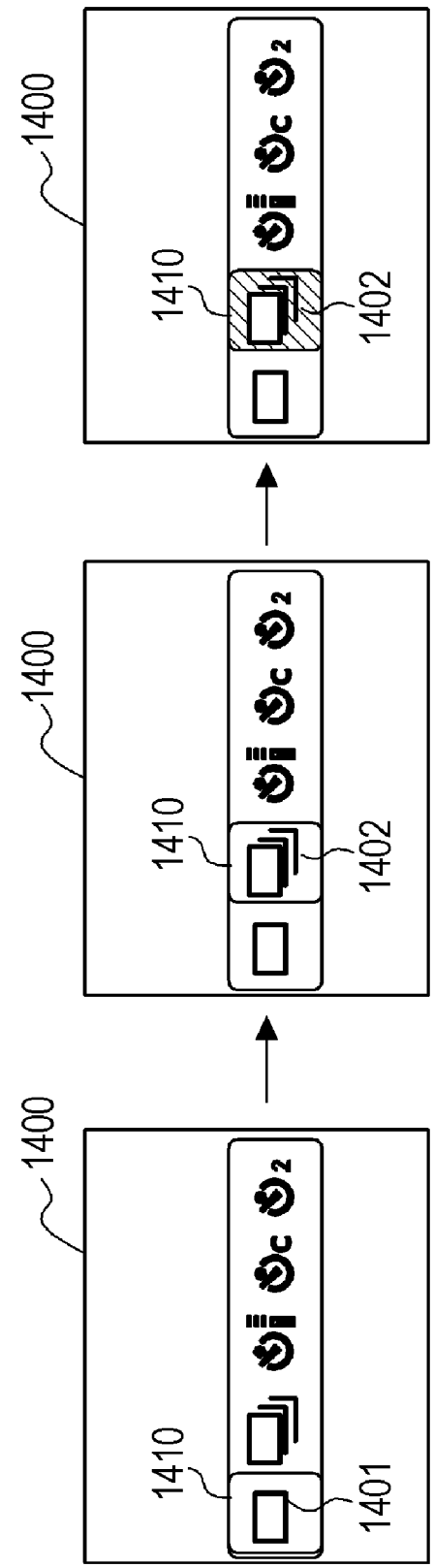

IMAGE PICKUP APPARATUS

BACKGROUND OF THE INVENTION

1. Field of the Invention

The present invention relates to an image pickup apparatus for capturing, recording, and playing back a still image and/or a moving image and a method and a computer-readable medium for controlling the image pickup apparatus.

2. Description of the Related Art

In recent years, the size of a display unit mounted in digital cameras (e.g., a thin-film transistor (TFT) liquid crystal display (LCD)) has been increasing. With the increasing size of display units, the number of digital cameras that display a list of a variety of setting values regarding picture taking on the display units has been increasing. In general, the setting values displayed on a display unit can be changed by a user.

Japanese Patent Laid-Open No. 11-275394 describes a configuration in which, in order to facilitate setting up of menus, an icon and text are displayed when menus are set, and, after menus are set, only icons are displayed. Thus, the displayed information is simplified.

Image pickup apparatuses including a display unit can display a list of the setting values of setting items, such as white balance, the recording image quality, a color space, the number of pictures remaining, and a battery level.

However, since these setting values and the pieces of information are displayed in a list format, it is difficult for a user to recognize displayed setting items at a glance. In particular, after the user changes the setting value of a desired setting item and returns to a list screen, it is difficult for the user to quickly find the changed setting value in the screen. Thus, it is difficult for the user to confirm the setting value.

SUMMARY OF THE INVENTION

Accordingly, the present invention provides an image pickup apparatus, a method, and a computer-readable medium for allowing a user to quickly find a changed setting value in a list screen after the user changes the setting value of a desired setting item and returns to the list screen.

According to an embodiment of the present invention, an image pickup apparatus includes an image pickup unit, a display control unit configured to perform control so that a list screen and a setting screen are selectively displayed on a first display unit, where the list screen includes a list of icons representing selected setting values of a plurality of setting items regarding an image capturing operation performed by the image pickup unit, and the setting screen includes icons representing possible setting values of one of the setting items, a selection operation unit configured to allow selection of one of the plurality of icons displayed in the setting screen, and an activation operation unit configured to activate the setting value indicated by the icon selected by using the selection operation unit. The display control unit performs control so that the selected icon in the setting screen is displayed in a selection display format distinguishable from the other icons. When the setting value is activated, the display control unit changes the setting screen to the list screen after highlighting the icon in an activation display format different from the selection display format in the setting screen for a predetermined period of time, and the display control unit highlights an icon representing the activated setting value in the list screen for a predetermined period of time.

According to another embodiment of the present invention, a method for controlling an image pickup apparatus is provided. The method includes performing control so that a list screen and a setting screen are displayed on a display unit of the image pickup apparatus, where the list screen includes a list of icons representing selected setting values of a plurality of setting items regarding image capturing operations performed by the image pickup apparatus, and the setting screen includes icons representing possible setting values of one of the setting items, selecting one of the plurality of icons displayed in the setting screen, and activating the setting value indicated by the selected icon. In performing control, the selected icon in the setting screen is displayed in a selection display format distinguishable from the other icons. When the setting value is activated, the setting screen is changed to the list screen after highlighting the icon in an activation display format different from the selection display format in the setting screen for a predetermined period of time, and the display control unit highlights an icon representing the activated setting value in the list screen for a predetermined period of time.

According to still another embodiment of the present invention, a computer-readable recording medium is provided containing computer-executable instructions to be utilized in an image pickup apparatus. Here, the medium includes computer-executable instructions for performing control so that a list screen and a setting screen are displayed on a display unit of the image pickup apparatus, the list screen including a list of icons representing selected setting values of a plurality of setting items regarding image capturing operations performed by the image pickup apparatus, the setting screen including icons representing possible setting values of one of the setting items; computer-executable instructions for selecting one of the plurality of icons displayed in the setting screen; and computer-executable instructions for activating the setting value indicated by the selected icon. In performing control, the selected icon in the setting screen is displayed in a selection display format distinguishable from the other icons and wherein, when the setting value is activated, the setting screen is changed to the list screen after highlighting the icon in an activation display format different from the selection display format in the setting screen for a predetermined period of time, and the display control unit highlights an icon representing the activated setting value in the list screen for a predetermined period of time.

According to yet still another embodiment of the present invention, a display control apparatus includes a display control unit configured to perform control so that a list screen and a setting screen are selectively displayed on a display unit, where the list screen includes a list of icons representing selected setting values of a plurality of setting items regarding an image capturing operation performed by the image pickup unit, and the setting screen includes icons representing possible setting values of one of the setting items, a selection operation unit configured to allow selection of one of the plurality of icons displayed in the setting screen, and an activation operation unit configured to activate the setting value indicated by the icon selected by using the selection operation unit. The display control unit performs control so that the selected icon in the setting screen is displayed in a selection display format distinguishable from the other icons. When the setting value is activated, the display control unit changes the setting screen to the list screen after highlighting the icon in an activation display format different from the selection display format in the setting screen for a predetermined period of time, and the display control unit highlights an icon representing the activated setting value in the list screen for a predetermined period of time.

According to yet still another embodiment of the present invention, a display control apparatus includes a display control unit configured to perform control so that a list screen and a setting screen are selectively displayed on a display unit, where the list screen includes a list of icons representing selected setting values of a plurality of setting items regarding an image capturing operation performed by the image pickup unit, and the setting screen includes icons representing possible setting values of one of the setting items, a selection operation unit configured to allow selection of one of the plurality of icons displayed in the setting screen, and an activation operation unit configured to activate the setting value indicated by the icon selected by using the selection operation unit. The display control unit performs control so that the selected icon in the setting screen is displayed in a selection display format distinguishable from the other icons. When the setting value is activated, the display control unit changes the setting screen to the list screen after highlighting the icon in an activation display format different from the selection display format in the setting screen for a predetermined period of time, and the display control unit highlights an icon representing the activated setting value in the list screen for a predetermined period of time.

According to yet still another embodiment of the present invention, a method for controlling a display is provided. The method includes performing control so that a list screen and a setting screen are displayed on a display unit, where the list screen includes a list of icons representing selected setting values of a plurality of setting items, and the setting screen includes icons representing possible setting values of one of the setting items, selecting one of the plurality of icons displayed in the setting screen, and activating the setting value indicated by the selected icon. In performing control, the selected icon in the setting screen is displayed in a selection display format distinguishable from the other icons. When the setting value is activated, the setting screen is changed to the list screen after highlighting the icon in an activation display format different from the selection display format in the setting screen for a predetermined period of time, and the display control unit highlights an icon representing the activated setting value in the list screen for a predetermined period of time.

Moreover, according to still another embodiment of the present invention, a computer-readable recording medium is provided containing computer-executable instructions to be utilized in an image pickup apparatus. Here, the medium includes computer-executable instructions for performing control so that a list screen and a setting screen are displayed on a display unit, the list screen including a list of icons representing selected setting values of a plurality of setting items, the setting screen including icons representing possible setting values of one of the setting items; computer-executable instructions for selecting one of the plurality of icons displayed in the setting screen; and computer-executable instructions for activating the setting value indicated by the selected icon. In performing control, the selected icon in the setting screen is displayed in a selection display format distinguishable from the other icons and wherein, when the setting value is activated, the setting screen is changed to the list screen after highlighting the icon in an activation display format different from the selection display format in the setting screen for a predetermined period of time, and the display control unit highlights an icon representing the activated setting value in the list screen for a predetermined period of time.

According to the present invention, a user can quickly find a changed setting value in a list screen after the user changes the setting value of a desired setting item and returns to the list screen. In this way, the user interface can be improved.

This summary of the invention does not necessarily describe all necessary features so that the invention may also be a sub-combination of these described features. Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIGS. 5A to 5C illustrate screen changes in the setting screen according to the first exemplary embodiment.

DESCRIPTION OF THE EMBODIMENTS

Exemplary embodiments of the present invention are described below with reference to an image pickup apparatus serving as a display control unit.

It is to be noted that the following exemplary embodiments are merely examples for implementing the present invention and can be appropriately modified or changed depending on individual constructions and various conditions of apparatuses to which the present invention is applied. Thus, the present invention is in no way limited to the following exemplary embodiments.

Figure 1:
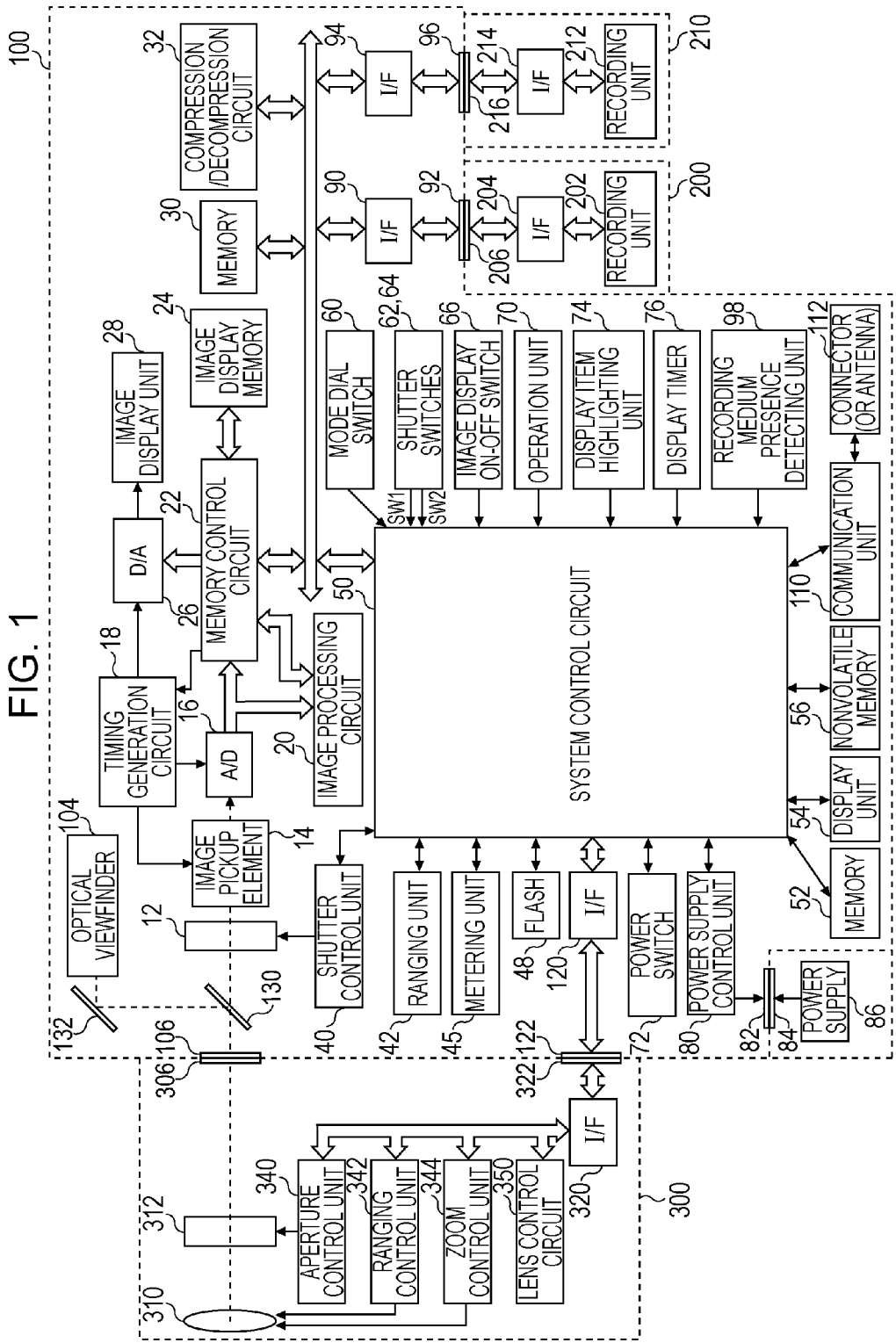
FIG. 1 illustrates an exemplary configuration of a digital camera according to a first exemplary embodiment of the present invention.

FIG. 1 illustrates an exemplary configuration of a digital camera representing an image pickup apparatus according to a first embodiment of the present invention. The digital camera includes a camera body 100 and a lens unit 300 removably mounted on the camera body 100. The lens unit 300 is mounted on the camera body 100 via mount units 106 and 306. When mounted on the camera body 100, the lens unit 300 can communicate with the camera body 100 via interfaces (I/Fs) 120 and 320 and contact points 122 and 322. In addition, electrical power is supplied from the camera body 100 to the lens unit 300 via the I/Fs 120 and 320 and the contact points 122 and 322.

The lens unit 300 includes a photo-taking lens 310 and an aperture 312. The camera body 100 includes a main mirror (a quick-return mirror) 130, a shutter 12, an image pickup element 14, and an analog-to-digital (A/D) converter 16. The main mirror 130 can have the following two modes: a mode in which the main mirror 130 is at an angle of 45° with respect to an optical axis so that the imaging light rays are directed towards a penta-Dach mirror 132 and a mode in which the main mirror 130 is moved away from the optical axis so that the imaging light rays are directed towards the image pickup element 14. Examples of the image pickup element 14 include a charge-coupled device (CCD) and a complementary metal-oxide semiconductor (CMOS) device that convert an optical image into an analog electrical signal. The A/D converter 16 converts the analog electrical signal output from the image pickup element 14 into a digital signal.

The camera body 100 further includes a timing generation circuit 18. The timing generation circuit 18 supplies a clock signal and a control signal to the image pickup element 14, the A/D converter 16, and a digital-to-analog (D/A) converter 26. The timing generation circuit 18 is controlled by a memory control circuit 22 and a system control circuit 50.

The camera body 100 further includes an image processing circuit 20 which performs a predetermined pixel interpolation process and a color conversion process on the data output from the A/D converter 16 or the data output from the memory control circuit 22. In addition, the image processing circuit 20 performs a predetermined computation process using the captured image data, and the system control circuit 50 controls a shutter control unit 40 and a ranging control unit 342 in the lens unit 300 using the computation result output from the image processing circuit 20. That is, the system control circuit 50 performs a TTL (through-the-lens) autofocus (AF) process, an auto exposure (AE) process, and a pre-flash (EF) process. Furthermore, the image processing circuit 20 performs a predetermined computation process using the captured image data and performs a TTL auto white balance (AWB) process using the computation results.

The memory control circuit 22 controls the A/D converter 16, the timing generation circuit 18, the image processing circuit 20, an image display memory 24, the D/A converter 26, a memory 30, and a compression/decompression circuit 32. The data output from the A/D converter 16 is written to the image display memory 24 or the memory 30 via the image processing circuit 20 and the memory control circuit 22. Alternatively, the data output from the A/D converter 16 is directly written to the image display memory 24 or the memory 30 via only the memory control circuit 22.

The camera body 100 further includes an image display unit 28, such as a TFT liquid crystal display (LCD). The image data written into the image display memory 24 is displayed on the image display unit 28 via the D/A converter 26. By sequentially displaying the captured image data using the image display unit 28, an electronic viewfinder function can be realized. In addition, setting values of the setting items are displayed on the image display unit 28, as described below. Furthermore, the image display unit 28 can turn on and off the display operation thereof in response to an instruction received from the system control circuit 50. By turning off the image display unit 28, power consumption of the digital camera can be significantly reduced.

The memory 30 stores the captured still image data and moving image data. The memory 30 has a capacity sufficient for storing a predetermined number of still images and a moving image for a predetermined period of time. Accordingly, even when the digital camera is in a continuous shooting mode in which a plurality of still images are continuously captured or in a panorama mode, the digital camera can write a large number of images into the memory 30 at high speed. In addition, the memory 30 can be used for a work area of the system control circuit 50.

The compression/decompression circuit 32 compresses and decompresses image data using, for example, an adaptive discrete cosine transformation (ADCT) method. The compression/decompression circuit 32 reads image data stored in the memory 30 and performs a compression process or a decompression process on the readout image data. Thereafter, the compression/decompression circuit 32 writes the processed data into the memory 30.

The shutter control unit 40 controls the shutter 12. An aperture control unit 340 controls the aperture 312. The ranging control unit 342 controls focusing of the photo-taking lens 310. A zoom control unit 344 controls zooming of the photo-taking lens 310. A ranging unit 42 performs a ranging operation. A metering unit 46 performs a metering operation. A flash 48 performs a flash operation. In addition, the flash 48 emits an AF-assist beam. Furthermore, the flash 48 has a flash light control function. The shutter control unit 40 and the ranging control unit 342 are controlled using a TTL method. The system control circuit 50 controls the shutter control unit 40 and the ranging control unit 342 using the result of computation performed by the image processing circuit 20 on the captured image data.

The system control circuit 50 performs overall control of the digital camera. A memory 52 stores constant values, variable values, and programs used for the operation of the system control circuit 50. A lens control circuit 350 controls the lens unit 300.

One or more display units 54 display the operation state and a message using characters and images in accordance with the execution of a program in the system control circuit 50. Examples of the display unit 54 include an LCD. The display unit 54 is a display unit different from the image display unit 28. At least one display unit 54 is disposed at a location easily viewable to a user in the vicinity of the operation unit of the camera body 100. For example, a combination of an LCD and a light-emitting diode (LED) may be used. In addition, some of the functions of the display unit 54 are realized in an optical viewfinder 104.

Among pieces of information displayed on the display unit 54, the following is displayed on an LCD: a single shot/continuous shooting mode indicator, a self-timer mode indicator, a compression ratio, the number of pixels of a recorded image, an ISO speed rating, the number of images recorded, the number of images remaining, a shutter speed, an aperture value, an exposure correction indicator, a flash indicator, a red-eye effect reduction mode indicator, a macro photographing mode indicator, a beep setting indicator, a battery level indicator for a clock, a main battery level indicator, an error indicator, information indicated by a plurality of digits, indicators as to whether recording media 200 and 210 are mounted, a communication I/F status indicator, and current date and time.

However, among pieces of information displayed on the display unit 54, the following is displayed in the optical viewfinder 104: a focus indicator, a camera shake warning indicator, a flash ready indicator, a shutter speed, an aperture value, an exposure correction indicator, and an ISO speed rating.

The camera body 100 further includes a nonvolatile memory 56 which is an electrically recordable and erasable memory. An example of the nonvolatile memory 56 is an electrically erasable programmable read-only memory (EEPROM).

Operation units 60, 62, 64, 66, and 70 are used for inputting instructions to the system control circuit 50 in terms of the operations of the system control circuit 50. Each of the operation units 60, 62, 64, 66, and 70 is formed from a switch, a dial, a touch panel, an eye control pointing device, a speech recognition device, or combinations thereof.

Particular examples of the operation units 60, 62, 64, 66, and 70 are described below. The operation unit 60 is formed from a mode dial switch. The operation unit 60 can switch between power-on and power-off. In addition, the operation unit 60 can change a mode to an auto photographing mode, a photographing mode, a panorama photographing mode, a playback mode, a multi-picture playback and erasable mode, or a personal computer (PC) connection mode.

When a shutter button (not shown) is pressed halfway down, a shutter switch-SW1 62 is turned on so that an autofocus (AF) process, an auto-exposure (AE) process, an AWB process, and an EF process are started. In addition, when the shutter button is pressed fully down, a shutter switch-SW2 64 is turned on so that a series of an exposure process, a development process, and a recording process is started. In the exposure process, a signal read out from the image pickup element 14 is written into the memory 30 via the A/D converter 16 and the memory control circuit 22 in the form of image data. In the development process, computation is performed by the image processing circuit 20 and the memory control circuit 22. In the recording process, the image data is read from the memory 30. Thereafter, the image data is decompressed by the compression/decompression circuit 32 and is written into the recording medium 200 or 210.

By using an image display on-off switch 66, the image display unit 28 can be turned on and off. This function allows supply of an electrical current to the image display unit 28 formed from, for example, a TFT LCD, to be stopped when a user takes a picture by using the optical viewfinder 104. Accordingly, power consumption can be reduced.

The operation unit 70 includes a variety of buttons and a touch panel. Examples of the buttons include a menu button, a set button, a macro button, a multi-picture playback page change button, a flash setting button, a single-shot mode/continuous shooting mode/self-timer mode switch button, a menu item selection plus (+) button, a menu item selection minus (−) button, a playback image selection plus (+) button, a playback image selection minus (−) button, a captured image quality selection button, an exposure correction button, a date and time setting button, an upward direction button, a downward direction button, a rightward direction button, a leftward direction button, and an information (INFO) button.

By using a power switch 72, the digital camera can be powered on and off. In addition, at the same time, auxiliary equipment connected to the camera body 100, such as the lens unit 300, an external strobe unit, and the recording medium 200 or 210, can be turned on and off by the power switch 72.

A display item highlighting unit 74 can highlight a changed setting item among setting items displayed on the image display unit 28. The display item highlighting unit 74 is described in more detail below.

A display timer 76 determines a time period for which the display item highlighting unit 74 highlights a display item.

A power supply control unit 80 includes a battery detection circuit, a DC-DC converter, and a switch circuit that switches between blocks to which power is supplied. The power supply control unit 80 detects the presence of a battery, the type of battery, and the battery level. Thereafter, the power supply control unit 80 controls the DC-DC converter on the basis of the detection results and an instruction received from the system control circuit 50 so as to supply a required voltage to each of the units including a recording medium for a required period of time.

The camera body 100 further includes connectors 82 and 84 and a power supply 86. Examples of the power supply 86 include a primary battery, such as an alkaline battery or a lithium battery, a secondary battery, such as a NiCd battery or a Li battery, and an AC adaptor.

Interfaces 90 and 94 serve as interfaces between a recording medium, such as a memory card and a hard disk, and the camera body 100. Connectors 92 and 96 are used for connecting the camera body 100 to a recording medium, such as a memory card and a hard disk. A recording medium presence detecting unit 98 detects whether the recording medium 200 or 210 is mounted in the connector 92 or 96.

While the present exemplary embodiment is described with reference to a digital camera having two interfaces and two connectors to which recording medium are connected, any number of interfaces and any number of connectors may be employed. In addition, different types of interfaces and connectors may be employed.

The interfaces and connectors can comply with a PCMCIA card standard, a CF (compact flash™) card standard, or a SD card standard. When the interfaces 90 and 94 and the connectors 92 and 96 comply with a PCMCIA card standard, a CF (compact flash™) card standard, or a SD card standard, the digital camera can exchange image data and management information associated with the image data with a peripheral device, such as a computer or a printer, by installing a communication card, such as a local area network (LAN) card, a modem card, a universal serial bus (USB) card, an IEEE 1394 card, a P1284 card, a SCSI card, or a personal handyphone system (PHS) card.

A user can take a picture by using only the optical viewfinder 104 without using the electronic viewfinder function of the image display unit 28. Some of the functions of the display unit 54 are provided in the optical viewfinder 104. Examples of such functions include a focus indicator, a camera shake warning indicator, a flash ready indicator, a shutter speed, an aperture value, an exposure correction value, and an ISO speed rating. The penta-Dach mirror 132 directs imaging light rays towards the optical viewfinder 104. The optical viewfinder 104 is an eyepiece finder. The user uses the optical viewfinder 104 by looking through the optical viewfinder 104.

A communication unit 110 allows communication using the RS232C, USB, IEEE 1394, P1284, and SCSI connectors, a modem, and a LAN either wired or wirelessly. A connector (or antenna) 112 is used for connecting the digital camera to another device through the communication unit 110. In the case of the antenna 112, wireless communication is provided between the digital camera and another device.

Examples of the recording medium 200 include a memory card and a hard disk. The recording medium 200 includes a recording unit 202 having a semiconductor memory or a magnetic disk, an interface 204 used for connection with the digital camera, and a connector 206 used for connection with the digital camera. Similarly, examples of the recording medium 210 include a memory card and a hard disk. The recording medium 210 includes a recording unit 212 having a semiconductor memory or a magnetic disk, an interface 214 used for connection with the digital camera, and a connector 216 used for connection with the digital camera.

Figure 2:
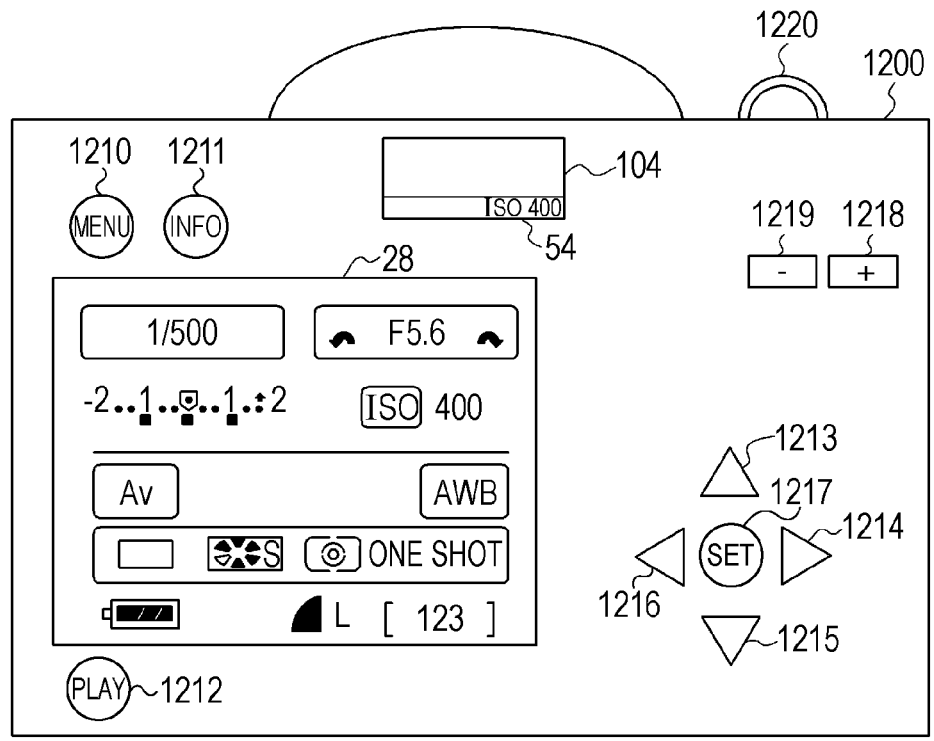
FIG. 2 is an external view of the digital camera according to the first exemplary embodiment.

FIG. 2 is an external rear view of the digital camera according to the present embodiment. The same numbering will be used in describing similar components in FIG. 2 as was used above in describing FIG. 1. The camera body 100 includes a casing 1200.

The operation unit 70 includes a variety of buttons 1210 to 1220. The menu button 1210 is used for displaying menu items. The info button 1211 is used for switching between display screens. The playback button 1212 is used for starting playback of images. The upward direction button 1213 is used for selecting an upward direction. The rightward direction button 1214 is used for selecting a rightward direction. The downward direction button 1215 is used for selecting a downward direction. The leftward direction button 1216 is used for selecting a rightward direction. In this example, the upward direction button 1213, the rightward direction button 1214, the downward direction button 1215, and the leftward direction button 1216 are independently provided. However, these buttons may be integrated into a four-way pad button. The set button 1217 is used for activating the current menu choice. The enlargement button 1218 is used for magnifying an image displayed on the screen. The reduction button 1219 is used for reducing an image displayed on the screen. The button 1220 functions as an electronic dial.

Figure 3:
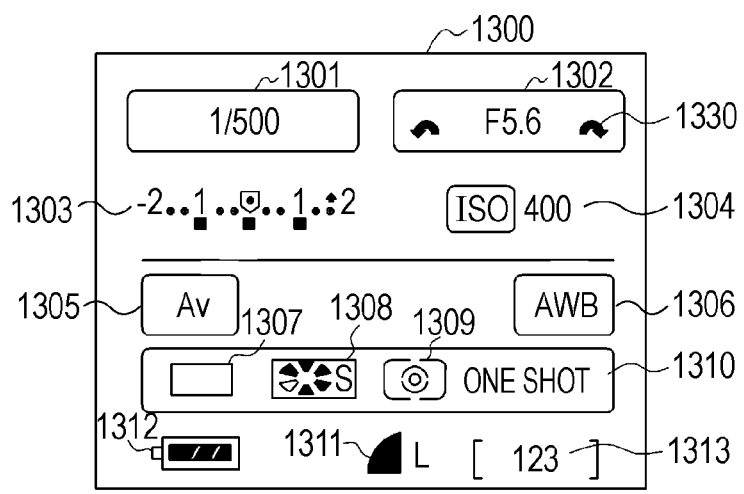
FIG. 3 illustrates an example of a list screen.

A list screen is displayed on the image display unit 28 provided on the back surface of the camera body 100. The list screen includes current setting values of a plurality of the setting items (e.g., setting values and setting modes) in a format of a list of icons. FIG. 3 illustrates an example of a list screen 1300 displayed on the image display unit 28. It should be noted that the list screen 1300 shown in FIG. 3 is only an example. For instance, any setting item of the digital camera can be displayed in addition to the setting items shown in FIG. 3.

When the info button 1211 is pressed, the digital camera displays the list screen 1300. If the info button 1211 is pressed again while the list screen 1300 is being displayed, the digital camera hides the list screen 1300. Alternatively, the digital camera may automatically display the list screen 1300 when the digital camera is powered on.

As shown in FIG. 3, icons 1301 to 1311 represent setting values of setting items that the user can freely change. Icons 1312 and 1313 represent information determined in accordance with the state of the digital camera.

The icon 1301 indicates a shutter speed. In the digital camera, light is made incident on the image pickup element 14 only when the shutter 12 is open. The shutter speed represents a time period while the shutter 12 is open. The shutter speed is controlled by the shutter control unit 40.

The icon 1302 shows an aperture value. The value indicates the opening area of the aperture 312 that controls the light intensity of a subject image. The aperture value is controlled by the aperture control unit 340. Electronic dial icons 1330 are displayed on either side of the aperture value icon 1302. The electronic dial icons 1330 indicate that the aperture value can be changed by rotating the electronic dial 1220.

The icon 1303 indicates an exposure correction value and auto exposure bracketing. The exposure correction value determines the brightness of an image. When auto exposure bracketing is instructed, a plurality of images having different brightnesses are captured.

The icon 1304 indicates the ISO speed rating. The ISO speed rating determines the sensitivity of the image pickup element 14. As the ISO speed rating increases, an image of a subject moving at higher speed can be more easily captured.

The icon 1305 indicates a photographing mode. Examples of a photographing mode include an auto photographing mode, a program photographing mode, a shutter speed priority AE photographing mode, an aperture priority AE photographing mode, a manual photographing mode, a depth priority AE photographing mode, and a panorama photographing mode. Examples of a photographing mode further include a portrait photographing mode, a landscape photographing mode, a macro photographing mode, a sport photographing mode, and a night scene photographing mode. These photographing modes can be switched between by using the operation unit 60.

The icon 1306 indicates a white balance. By using a white balance function, a white color is appropriately reproduced under any type of light. Examples of a setting of light include an auto white balance, sunlight, clear weather, cloudy weather, candescent light, fluorescent light, a strobe, an area shaded from the sun.

The icon 1307 indicates a drive mode. Examples of a drive mode include a single shot mode, a continuous shooting mode, and a self-timer mode.

The icon 1308 indicates a picture style. As used herein, the term "picture style" refers to a type of image processing performed in order to obtain a desired image. Examples of a picture style include "Standard", "Landscape", "Portrait", "Faithful", and "Monochrome". The image processing circuit 20 performs predetermined computation on the captured image in accordance with a selected picture style.

The icon 1309 indicates a metering mode. An area of a screen in which the luminance is measured is determined by the metering mode. Examples of the metering mode include an evaluative metering mode, a partial metering mode, and a spot metering mode. A metering unit 45 performs a metering process in accordance with the selected metering mode.

The icon 1310 indicates an AF mode. The AF mode determines a method used for auto focusing. Examples of the AF mode include a single shot mode, an AI servo mode, and an AI focus mode.

The icon 1311 indicates the quality of an image to be recorded. The quality of an image to be recorded is determined by the size of the image and a compression ratio. The size of an image is represented by one of letters "S", "M", and "L". The compression ratio is represented by "Normal" or "Fine".

The icon 1312 indicates a battery level. Information as to the battery level detected by the power supply control unit 80 is displayed as the icon 1312.

The icon 1313 indicates the number of images remaining in the recording medium mounted in the digital camera.

When the user wants to change one of the settings represented by the icons 1301 to 1311, the user changes the screen to a setting screen of the setting item to be changed, as described below. The setting screen is provided for each of the setting items displayed in the list screen 1300 in order to change the setting value. In order to change the list screen 1300 to a setting screen of one of the setting items, one of the various buttons is used. For example, when the user changes the setting of the drive mode, the user presses the rightward direction button 1214. Thus, a setting screen of the drive mode is displayed on the image display unit 28.

Figure 4:
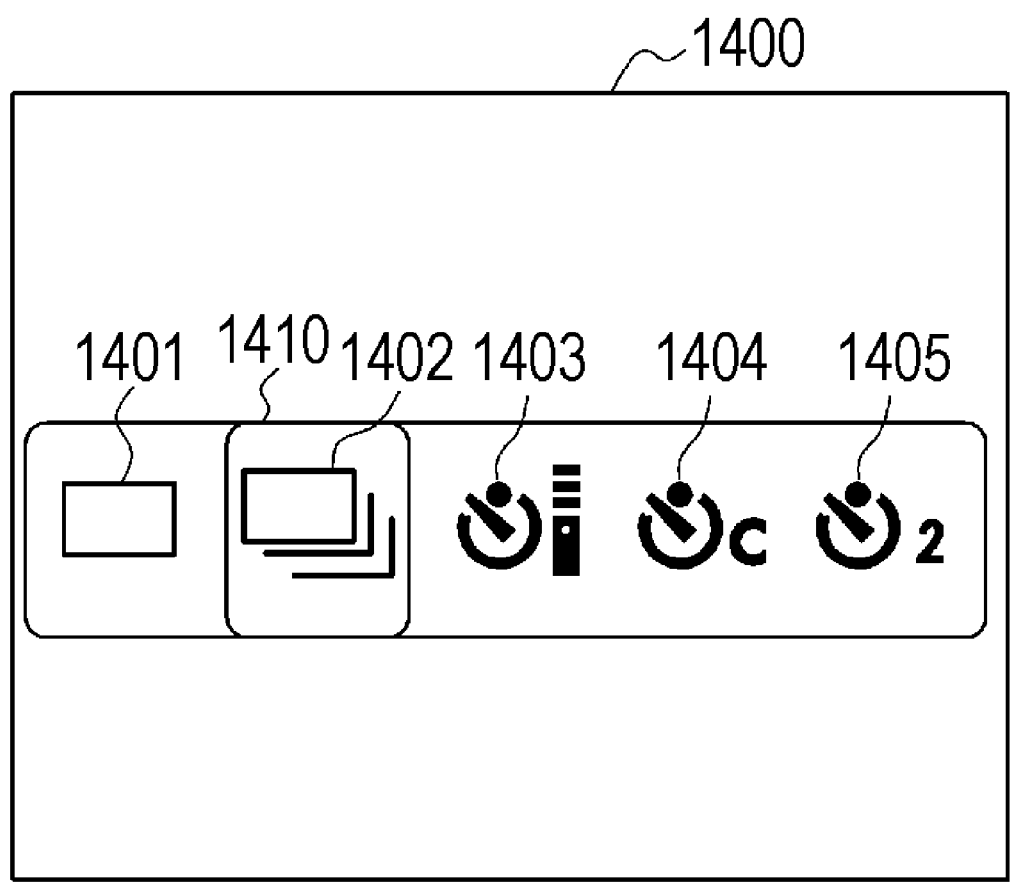
FIG. 4 illustrates an example of a setting screen.

FIG. 4 illustrates an example of a setting screen displayed on the image display unit 28. In this example, description is made with reference to a setting screen 1400 of the drive mode. As noted above, when changing the setting of the drive mode, the user presses the rightward direction button 1214 so that the setting screen 1400 of the drive mode is displayed.

The setting screen 1400 of the drive mode includes a plurality of icons 1401 to 1405 indicating possible setting values for the drive mode. The icon 1401 indicates a single shot mode. The icon 1402 indicates a continuous shooting mode. The icon 1403 indicates a self-timer mode (a remote control shooting mode). The icon 1404 indicates a self-timer mode (a custom self-timer mode). The icon 1405 indicates a self-timer mode (a 2-second self-timer mode).

An indicator 1410 indicates which one of the setting items 1401 to 1405 is currently selected. The indicator 1410 highlights a selected setting icon using a highlight style. Examples of the style of the highlight include changing the color of the icon and surrounding the icon with a frame border.

The icons 1401 to 1405 are arranged in a horizontal direction. By moving the indicator 1410 using the rightward direction button 1214 or the leftward direction button 1216, one of the icons 1401 to 1405 can be selected. Since the digital camera is designed so that the setting screen 1400 of the drive mode appears when the rightward direction button 1214 is pressed, the icons 1401 to 1405 are arranged in the horizontal direction. In this way, a series of operations of displaying the setting screen 1400 and selecting one of the icons 1401 to 1405 can be smoothly performed. That is, if a setting screen of some setting item appears when the upward direction button 1213 or the downward direction button 1215 is pressed, it is desirable that icons displayed in the setting screen are arranged in the vertical direction.

FIGS. 5A to 5C illustrate screens appearing when one of the icons 1401 to 1405 displayed in the setting screen 1400 shown in FIG. 4 is selected and the setting value represented by the selected icon is activated.

In FIG. 5A, the indicator 1410 is placed on the icon indicating the currently selected setting (i.e., a single shot mode). When the rightward direction button 1214 is pressed, the indicator 1410 moves to the right. In contrast, when the leftward direction button 1216 is pressed, the indicator 1410 moves to the left. That is, when the rightward direction button 1214 shown in FIG. 5A is pressed, the indicator 1410 moves one step to the right and selects the icon indicating a continuous shooting mode, as shown in FIG. 5B.

By using the rightward direction button 1214 and the leftward direction button 1216, an icon of a desired setting value can be selected. Subsequently, by pressing the set button 1217, the selected setting value is activated. FIG. 5C illustrates a screen appearing after the set button 1217 is pressed while the screen shown in FIG. 5B is being displayed. At that time, the display item highlighting unit 74 highlights the indicator 1410 in a format different from that in a selection mode. For example, the display item highlighting unit 74 changes a background color surrounded by the indicator 1410 or changes the color of the indicator 1410. Alternatively, the display item highlighting unit 74 may magnify the setting icon or blink the setting icon in order to highlight the setting icon.

After the setting icon has been highlighted for a predetermined period of time, the setting is activated for the digital camera. Thereafter, a list screen is displayed again. The elapse of the predetermined period of time is detected by the display timer 76.

FIGS. 6A to 6F illustrate screens appearing when the list screen 1300 is changed to the setting screen 1400, the setting is activated, and the setting screen 1400 is returned to the list screen 1300.

Figure 6A:
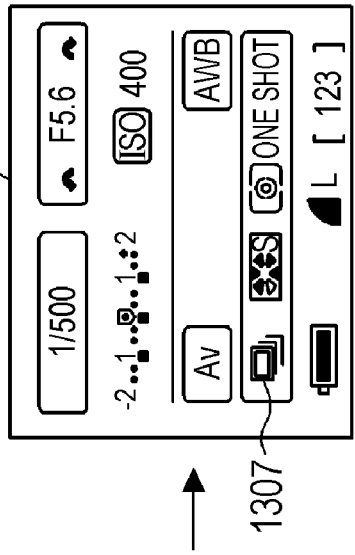
FIGS. 6A to 6F illustrate screen changes when the list screen is changed to the setting screen and, subsequently, the setting screen returns to the list screen.
Figure 6B:
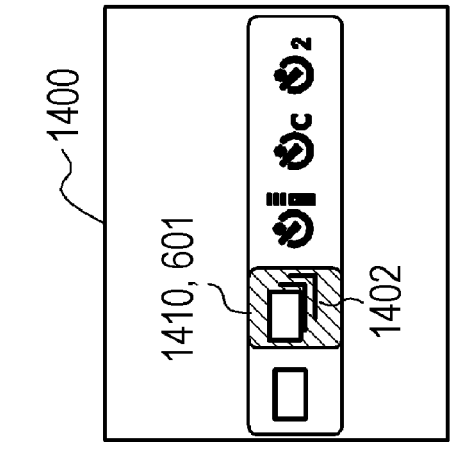

As shown in FIG. 6A, the list screen 1300 is displayed on the image display unit 28. If the rightward direction button 1214 is pressed while this screen is being displayed, the setting screen 1400 of the drive mode is displayed on the image display unit 28, as shown in FIG. 6B. If the rightward direction button 1214 is pressed while the setting screen 1400 is being displayed, the indicator 1410 moves one step to the right so that a continuous shooting mode is selected, as shown in FIG. 6C. For example, if, at that time, the set button 1217 is pressed, a highlight 601 is displayed so as to indicate that a continuous shooting mode is activated, as shown in FIG. 6D.

Figure 6E:
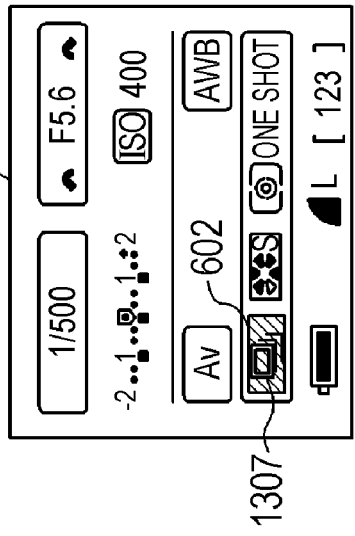
Figure 6C:
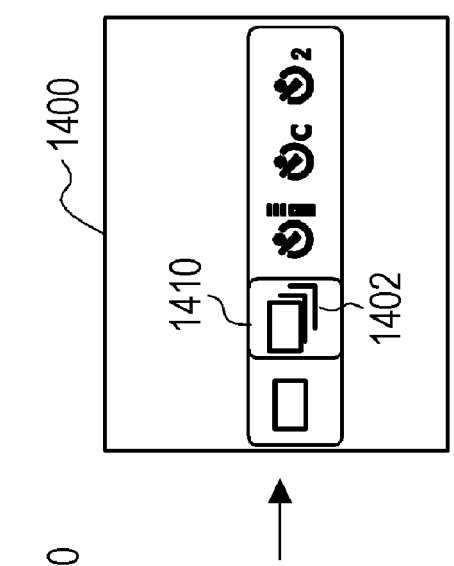
Figure 6F:
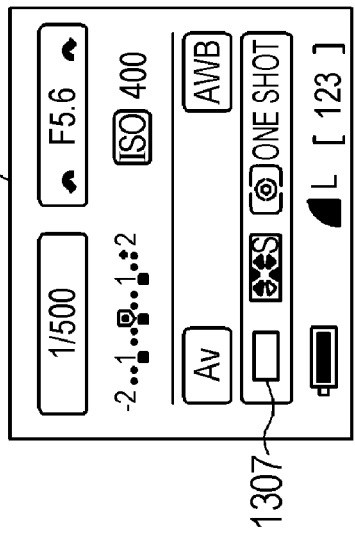
Figure 6D:
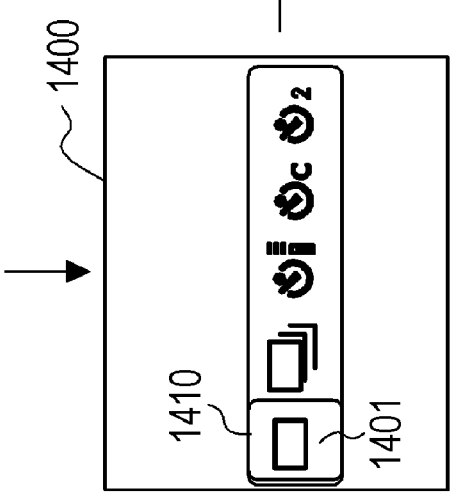

After the highlight 601 has been displayed for a predetermined period of time, the screen is changed to the list screen 1300, as shown in FIG. 6E. At that time, in the list screen 1300, the icon 1307 indicating the immediately previously set drive mode (i.e., a continuous shooting mode) is displayed and highlighted (with a highlight 602). By using the highlight 602 having a format the same as that of the highlight 601 displayed in the setting screen 1400, the user can easily recognize that the changed setting is highlighted. For example, the same format may be the same color. Alternatively, the shapes of the frame borders may be the same, or the same blinking operation may be performed. In this way, by using the highlight 602 in the list screen 1300, the user can recognize where the changed setting information is displayed in the list screen 1300 at a glance. Note that, after the highlight 602 has been displayed for a predetermined period of time, the highlight 602 disappears, as shown in FIG. 6F.

Figure 7:
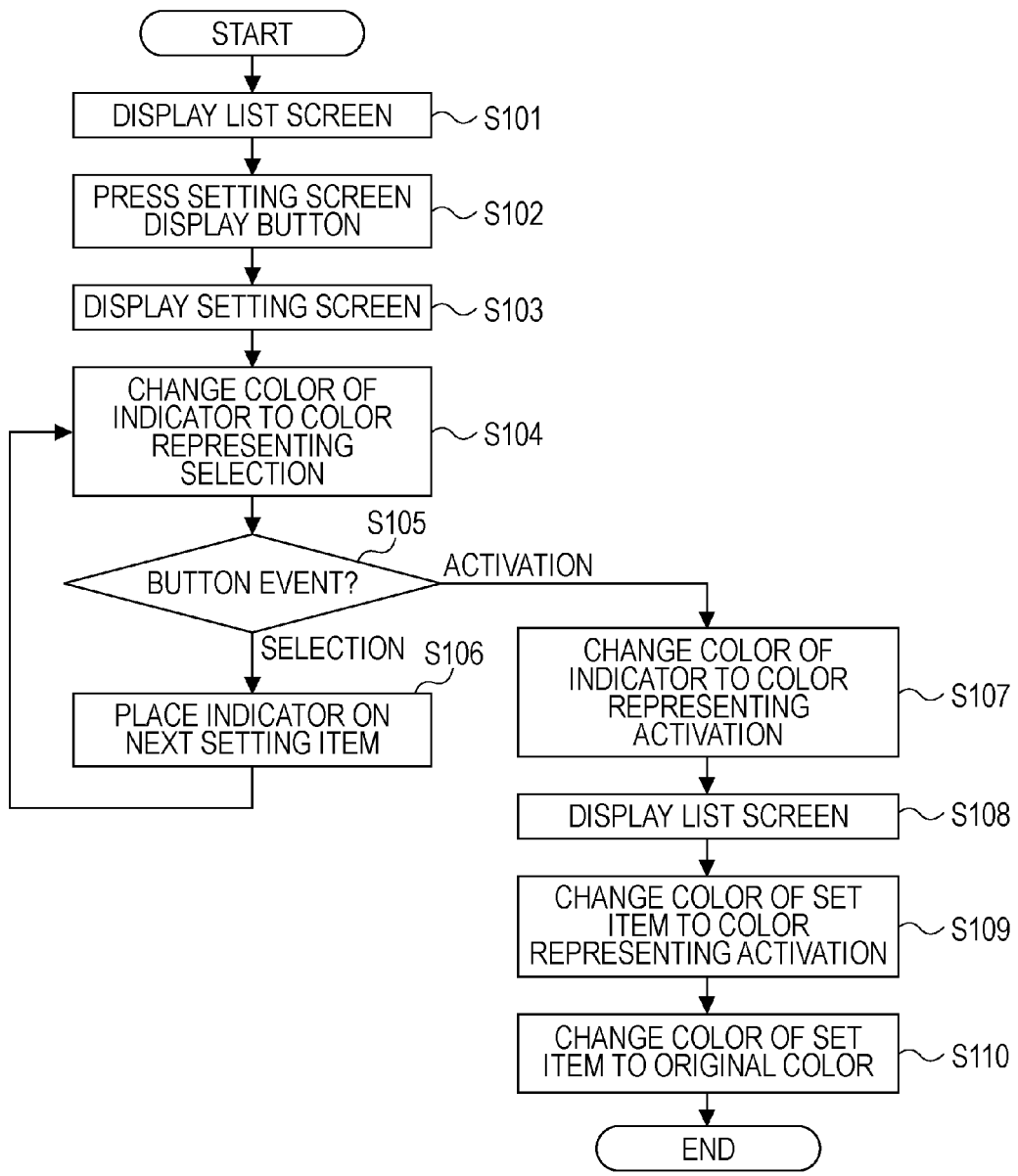
FIG. 7 is a flowchart illustrating an exemplary operation of displaying screens performed by the digital camera according to the first exemplary embodiment.

FIG. 7 is a flowchart illustrating an exemplary operation of displaying screens performed by the digital camera. This operation is performed by the system control circuit 50 in cooperation with the display item highlighting unit 74 and the display timer 76. That is, according to the present exemplary embodiment, the system control circuit 50, the display item highlighting unit 74, and the display timer 76 serve as a display control unit of the present invention. The exemplary operation of displaying screens performed by the digital camera is described below with reference to FIGS. 6A to 6F.

When the info button 1211 is pressed, the list screen 1300 is displayed on the image display unit 28, as shown in FIG. 6A (step S101).

When a setting screen display button (the rightward direction button 1214 in the case of a drive mode) is pressed (step S102), the setting screen 1400 of the drive mode is displayed on the image display unit 28, as shown in FIG. 6B (step S103). Thereafter, one of icons indicating the setting value currently set for the digital camera is focused upon, and the indicator 1410 enters a selection mode (step S104). In this example, in order to indicate the selection mode, the indicator 1410 is displayed with a predetermined color.

Subsequently, the digital camera detects a button event (step S105). If, in step S105, one of selection operation portions (the rightward direction button 1214 and the leftward direction button 1216 in the case of the drive mode) is pressed, the digital camera moves the indicator 1410 in accordance with the operation (step S106) so that the indicator 1410 enters the selection mode, as shown in FIG. 6C (step S104).

However, if, in step S105, an activation operation portion (the set button 1217 in the case of the drive mode) is pressed, the highlight 601 is displayed for the icon of the activated setting value, as shown in FIG. 6D (step S107). In this example, the highlight 601 for the indicator 1410 may be a predetermined color indicating the activation. After a predetermined period of time has elapsed, the screen is changed to the list screen 1300, as shown in FIG. 6E (step S108). In addition, the icon 1307 of the drive mode determined in step S107 is highlighted with the highlight 602 (step S109). Here, as in step S107, the same predetermined color for indicating the activation is used for an area surrounding the icon 1307 as the highlight 602. After the highlight 602 has been displayed for a predetermined period of time, the highlight 602 is cleared, as shown in FIG. 6F. Thus, the screen is returned to the normal list screen 1300 (step S110).

The advantages of the present embodiment are described below. As shown in FIG. 3, since the plurality of icons 1301 to 1311 indicating setting values of the setting items are displayed on the image display unit 28, it is difficult for the user to find the information of the setting item that the user has changed in the screen at a glance.

Accordingly, when a setting value is changed and activated in the setting screen 1400, the icon representing the activated setting value is highlighted for a predetermined period of time. Thereafter, the setting screen 1400 is changed to the list screen 1300. In the list screen 1300, the icon representing the activated setting value is highlighted for a predetermined period of time. In this way, when the screen is returned to the list screen 1300, the user can recognize where the changed setting is displayed in the list screen 1300 at a glance. As a result, a user interface can be improved.

In addition, by using the same highlight style for the icon in the setting screen 1400 and the icon in the list screen 1300 after the setting screen 1400 is returned to the list screen 1300, the user can easily recognize the activated setting in the changing screens.

A second exemplary embodiment of the present invention is described next. The first exemplary embodiment has been described with reference to a configuration including a selection operation unit that selects one of icons indicating setting values displayed in a setting screen and an activation operation unit that activates the setting value selected by the selection operation unit. In contrast, the second exemplary embodiment is described with reference to a configuration including a selection and activation operation unit that selects one of icons indicating setting values displayed in a setting screen and activates the selected setting value at the same time. The basic configuration of a digital camera is similar to that of the digital camera according to the first exemplary embodiment. In the following description, the difference between the second exemplary embodiment and the first exemplary embodiment is mainly described.

Figure 8A:
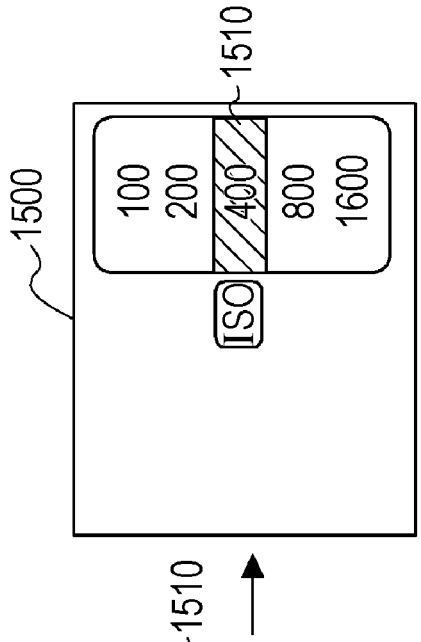
FIGS. 8A to 8C illustrate screen changes in a setting screen according to a second exemplary embodiment of the present invention.
Figure 8B:
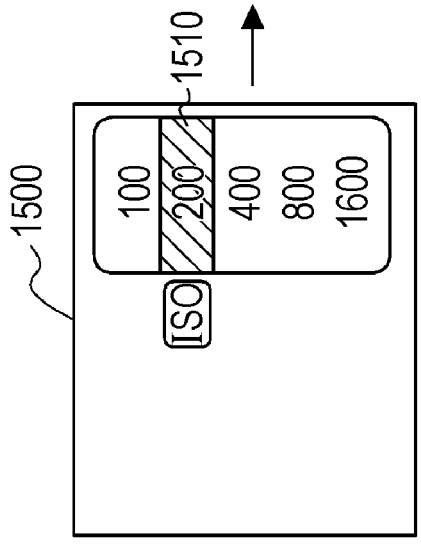
Figure 8C:
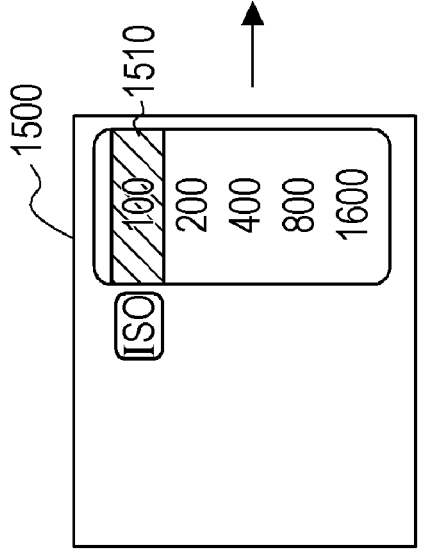

FIGS. 8A to 8C illustrate an example of setting screens displayed on the image display unit 28. In this example, description is made with reference to a setting screen 1500 of an ISO speed rating. In the setting screen 1500 of an ISO speed rating, icons indicating ISO speed ratings "100", "200", "400", "800", and "1600" are arranged in the vertical direction. In addition, by moving an indicator 1510 using the upward direction button 1213 and the downward direction button 1215, one of the icons can be selected and activated. The indicator 1510 highlights a selected setting icon by using a highlight style. Examples of the highlight style include changing the color of the icon and surrounding the icon with a frame border.

In FIG. 8A, the indicator 1510 is placed on the current setting value (i.e., "100"). When the downward direction button 1215 is pressed, the indicator 1510 is moved downwards. When the upward direction button 1213 is pressed, the indicator 1510 is moved upwards. That is, if, in FIG. 8A, the downward direction button 1215 is pressed, the indicator 1510 is moved one step down, as shown in FIG. 8B. Thus, a setting value "200" is selected and activated. If the downward direction button 1215 is further pressed, the indicator 1510 is moved one step down, as shown in FIG. 8C. Thus, a setting value "400" is selected and activated.

According to the present embodiment, among setting values of a setting item listed in the list screen 1300, when a setting value also displayed in another display unit is selected, the setting value is immediately activated. That is, without pressing the set button 1217 as in the first exemplary embodiment, a setting value is selected and activated when one of the upward direction button 1213, the rightward direction button 1214, the downward direction button 1215, and the leftward direction button 1216 is pressed.

For example, the ISO speed rating is displayed on the display unit 54 in the optical viewfinder 104 as well. Therefore, the user can change the ISO speed rating while looking through the optical viewfinder 104 or while viewing the image display unit 28. When the user can change the ISO speed rating while viewing through the optical viewfinder 104, the user wants to take a picture immediately after changing the ISO speed rating, in general. Accordingly, the setting value is activated without pressing the set button 1217. This design is also applied to the shutter speed setting and the aperture value setting.

Figure 9:
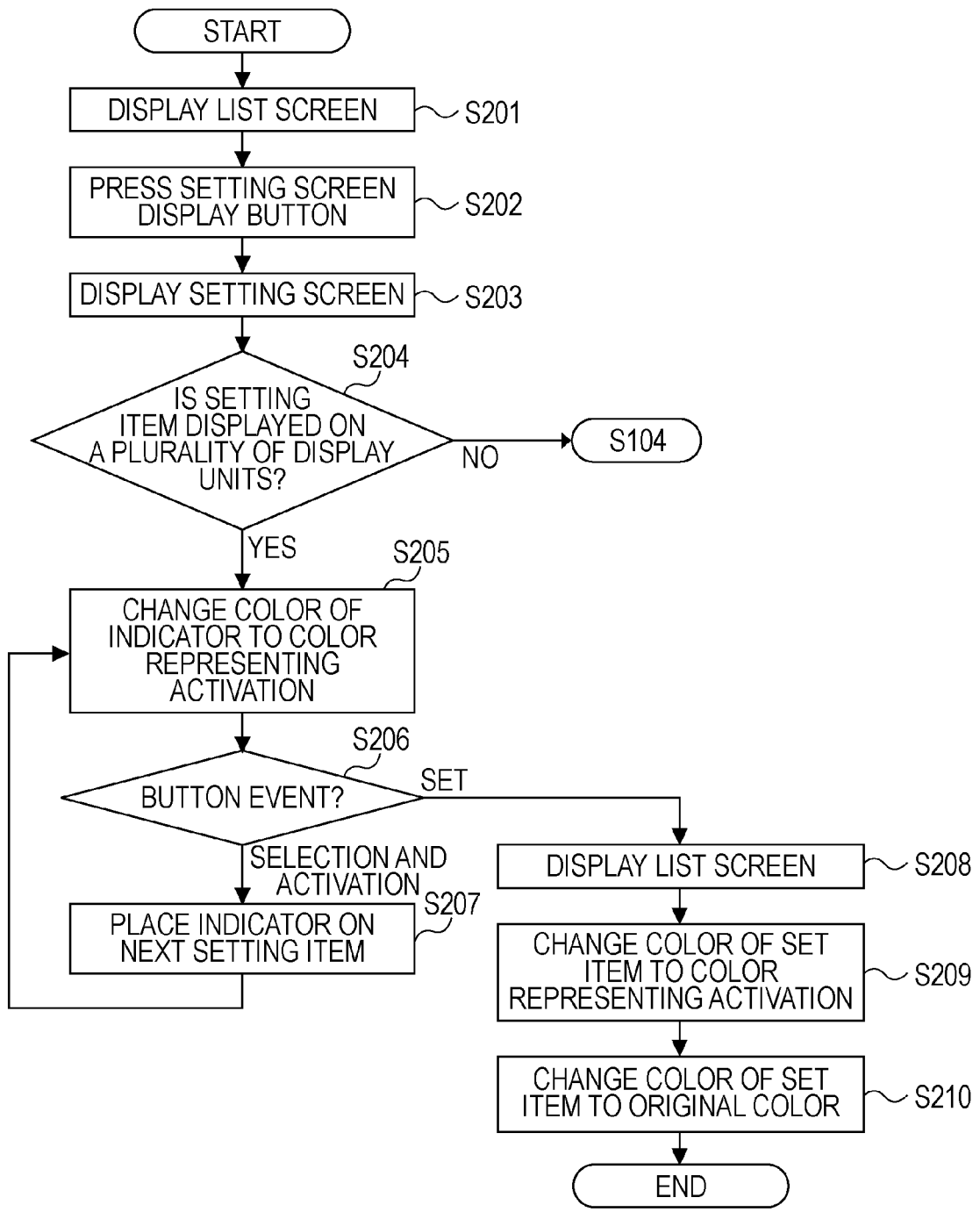
FIG. 9 is a flowchart illustrating an exemplary operation of displaying screens performed by a digital camera according to the second exemplary embodiment.

FIG. 9 is a flowchart illustrating an exemplary operation of displaying screens performed by the digital camera. The processing performed in steps S201 to S203, step S206, step S207, and steps S208 to S210 are similar to the processing performed in steps S101 to S103, step S105, step S106, and steps S108 to S110 shown in FIG. 7, respectively.

After the setting screen is displayed in step S203, it is determined whether the setting item is displayed on a plurality of display units (step S204). If the setting item is displayed on a plurality of display units, an indicator is highlighted (step S205) in order to inform the user of activation (step S205). In this example, the indicator 1510 is highlighted by using a predetermined color representing activation. However, if the setting item is not displayed on a plurality of display units, the processing proceeds to step S104 shown in FIG. 7.

In step S205, it is determined whether a button event is present (step S206). If, in step S206, a selection and activation operation portion (the upward direction button 1213 or the downward direction button 1215 in the case of the ISO speed ratings) is pressed, the indicator 1510 is moved in accordance with the operation (step S207). In addition, the indicator 1510 is highlighted in order to inform the user of activation (step S205).

In contrast, if, in step S206, the set button 1217 is pressed, the screen is changed to the list screen 1300 (step S208). According to the second exemplary embodiment, immediately after the setting value is changed, the setting value is activated, and the setting value is set in the digital camera. Accordingly, the screen is returned to the list screen 1300 without the indicator 1510 being highlighted. In the list screen 1300, the icon representing the setting value determined in step S207 is highlighted (step S209). As in step S205, the highlight is represented by displaying an area having a predetermined color and surrounding the icon. After the icon has been highlighted for a predetermined period of time, the highlight is cleared. Thus, the screen is returned to the normal list screen 1300 (step S210).

While the above exemplary embodiments of the present invention have been described with reference to an image pickup apparatus serving as a display control apparatus, the above exemplary embodiments can be applied to cell phones.

The present invention can also be achieved by supplying a computer-readable medium (or a recoding medium) storing software code that achieves the functions of the above-described embodiments to a system or an apparatus and by causing a computer (central processing unit (CPU) or microprocessing unit (MPU)) of the system or apparatus to read and execute the code.

In such a case, the code itself read out of the storage medium realizes the functions of the above-described exemplary embodiments. Therefore, the code itself and the computer-readable storage medium storing the program code can also realize the present invention.

Examples of the storage medium for supplying the program code include a flexible disk, a hard disk, an optical disk, a magneto optical disk, a CD-ROM (compact disk-read only memory), a CD-R (CD recordable), a magnetic tape, a nonvolatile memory card, a ROM (read only memory) or the like.

Furthermore, in addition to realizing the functions of the above-described exemplary embodiments by using a computer executing the readout program, the functions of the above-described exemplary embodiments can also be achieved by basic software or an operating system (OS) running on the computer and executing some of or all of the functions of the above-described exemplary embodiments.

Still furthermore, the present invention can be achieved by writing the program code read out of the storage medium to a memory of an add-on expansion board of a computer or a memory of an add-on expansion unit connected to a computer. In such a case, the functions of the above-described exemplary embodiments can be realized by a process in which, after the program code is written, a CPU in the add-on expansion board or in the add-on expansion unit executes some of or all of the functions in the above-described exemplary embodiments under the control of the program code.

Note that, as used herein, the term "icon" refers to any graphic object capable of visually representing the current setting value and possible setting value. Accordingly, the icon can be also referred to as a "display item" or a "mark".

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-011995 filed Jan. 22, 2008, which is hereby incorporated by reference herein in its entirety.

What is claimed is:

1. An image pickup apparatus comprising:
an image pickup unit;
a display control unit configured to perform control so that a list screen and a setting screen are selectively displayed on a first display unit, the list screen including a list of icons representing selected setting values of a plurality of setting items regarding an image capturing operation performed by the image pickup unit, the setting screen including icons representing possible setting values of one of the setting items;
a selection operation unit configured to allow selection of one of the plurality of icons displayed in the setting screen; and
an activation operation unit configured to activate the setting value indicated by the icon selected by using the selection operation unit;
wherein the display control unit performs control so that the selected icon in the setting screen is displayed in a selection display format distinguishable from the other icons and wherein, when the setting value is activated, the display control unit changes the setting screen to the list screen after highlighting the icon in an activation display format different from the selection display format in the setting screen for a predetermined period of time, and wherein the display control unit highlights an icon representing the activated setting value in the list screen for a predetermined period of time.

2. The image pickup apparatus according to claim 1, wherein the display control unit clears the highlight after the display control unit has highlighted the icon of the activated setting value in the list screen for the predetermined period of time.

3. The image pickup apparatus according to claim 1, further comprising a control unit configured to automatically activate, without the activation operation unit being operated, a setting value represented by one of icons displayed in a setting screen and selected by the selection operation unit in the case in which the setting screen is displayed on a second display unit in a viewfinder through which a user looks in addition to on the first display unit;
wherein the display control unit performs control so that the selection display format is not used in the setting screen displayed on the second display unit in addition to on the first display unit.

4. The image pickup apparatus according to claim 3, further comprising a determination unit configured to, when displaying the setting screen, determine whether the icons representing setting values to be set in the setting screen are displayed in both the setting screen of the first display unit and the setting screen of the second display unit in the viewfinder.

5. The image pickup apparatus according to claim 1, wherein the display control unit performs control so that the highlight placed in the setting screen is the same as a highlight placed in the subsequently displayed list screen.

6. The image pickup apparatus according to claim 1, further comprising different operation members, configured to switch the list screen to the setting screen for one of the setting items.

7. The image pickup apparatus according to claim 6, wherein each of the operation members is one of buttons used for instructing one of upward, downward, leftward, and rightward directions and wherein, for the setting item switchable to the setting screen by pressing one of the upward button and the downward button, a plurality of icons representing the setting values of the setting item are displayed in the setting screen so as to be arranged in a vertical direction, and the upward direction button and the downward direction button function as the selection operation unit, and wherein, for the setting item switchable to the setting screen by pressing one of the rightward direction button and the leftward direction button, a plurality of icons representing the setting values of the setting item are displayed in the setting screen so as to be arranged in horizontal direction, and the rightward direction button and the leftward direction button function as the selection operation unit.

8. A method for controlling an image pickup apparatus, comprising:
performing control so that a list screen and a setting screen are displayed on a display unit of the image pickup apparatus, the list screen including a list of icons representing selected setting values of a plurality of setting items regarding image capturing operations performed by the image pickup apparatus, the setting screen including icons representing possible setting values of one of the setting items;
selecting one of the plurality of icons displayed in the setting screen; and
activating the setting value indicated by the selected icon;
wherein, in performing control, the selected icon in the setting screen is displayed in a selection display format distinguishable from the other icons and wherein, when the setting value is activated, the setting screen is changed to the list screen after highlighting the icon in an activation display format different from the selection display format in the setting screen for a predetermined period of time, and the display control unit highlights an icon representing the activated setting value in the list screen for a predetermined period of time.

9. A computer-readable recording medium containing computer-executable instructions to be utilized in an image pickup apparatus, the medium comprising:
computer-executable instructions for performing control so that a list screen and a setting screen are displayed on a display unit of the image pickup apparatus, the list screen including a list of icons representing selected setting values of a plurality of setting items regarding image capturing operations performed by the image pickup apparatus, the setting screen including icons representing possible setting values of one of the setting items;

computer-executable instructions for selecting one of the plurality of icons displayed in the setting screen; and computer-executable instructions for activating the setting value indicated by the selected icon;

wherein, in performing control, the selected icon in the setting screen is displayed in a selection display format distinguishable from the other icons and wherein, when the setting value is activated, the setting screen is changed to the list screen after highlighting the icon in an activation display format different from the selection display format in the setting screen for a predetermined period of time, and the display control unit highlights an icon representing the activated setting value in the list screen for a predetermined period of time.

10. A display control apparatus comprising:

a display control unit configured to perform control so that a list screen and a setting screen are selectively displayed on a display unit, the list screen including a list of icons representing selected setting values of a plurality of setting items regarding an image capturing operation performed by the image pickup unit, the setting screen including icons representing possible setting values of one of the setting items;

a selection operation unit configured to allow selection of one of the plurality of icons displayed in the setting screen; and an activation operation unit configured to activate the setting value indicated by the icon selected by using the selection operation unit;

wherein the display control unit performs control so that the selected icon in the setting screen is displayed in a selection display format distinguishable from the other icons and wherein, when the setting value is activated, the display control unit changes the setting screen to the list screen after highlighting the icon in an activation display format different from the selection display format in the setting screen for a predetermined period of time, and wherein the display control unit highlights an icon representing the activated setting value in the list screen for a predetermined period of time.

11. A method for controlling a display, comprising:

performing control so that a list screen and a setting screen are displayed on a display unit, the list screen including a list of icons representing selected setting values of a plurality of setting items, the setting screen including icons representing possible setting values of one of the setting items;

selecting one of the plurality of icons displayed in the setting screen; and activating the setting value indicated by the selected icon;

wherein, in performing control, the selected icon in the setting screen is displayed in a selection display format distinguishable from the other icons and wherein, when the setting value is activated, the setting screen is changed to the list screen after highlighting the icon in an activation display format different from the selection display format in the setting screen for a predetermined period of time, and the display control unit highlights an icon representing the activated setting value in the list screen for a predetermined period of time.

12. A computer-readable recording medium containing computer-executable instructions to be utilized in an image pickup apparatus, the medium comprising:

computer-executable instructions for performing control so that a list screen and a setting screen are displayed on a display unit, the list screen including a list of icons representing selected setting values of a plurality of setting items, the setting screen including icons representing possible setting values of one of the setting items;

computer-executable instructions for selecting one of the plurality of icons displayed in the setting screen; and computer-executable instructions for activating the setting value indicated by the selected icon;

wherein, in performing control, the selected icon in the setting screen is displayed in a selection display format distinguishable from the other icons and wherein, when the setting value is activated, the setting screen is changed to the list screen after highlighting the icon in an activation display format different from the selection display format in the setting screen for a predetermined period of time, and the display control unit highlights an icon representing the activated setting value in the list screen for a predetermined period of time.

* * * * *